United States Patent

[11] 3,569,767

| [72] | Inventor | Royal H. Benson |
| | | 1522 19th Ave. North, Texas City, Tex. 77590 |
| [21] | Appl. No. | 688,836 |
| [22] | Filed | Dec. 7, 1967 |
| [45] | Patented | Mar. 9, 1971 |

[54] FLOW IONIZATION CHAMBER
9 Claims, 7 Drawing Figs.

[52] U.S. Cl. .................................................. 313/231, 250/83.6, 313/93
[51] Int. Cl. ................................................ H01j 17/26
[50] Field of Search .......................................... 55/67, 197, 386; 250/43.5 (PC), 83.6 (FT); 313/93, 231; 315/111; 324/33; 313/220

[56] References Cited
UNITED STATES PATENTS
| 3,007,072 | 10/1961 | McGinn et al. ............... | 313/231 |
| 3,246,115 | 4/1966 | Johnson ...................... | 313/231X |

*Primary Examiner*—Raymond F. Hossfeld
*Attorneys*—Elizabeth F. Sporar, M. N. Cheairs and H. B. Roberts ABSTRACT: A flow ionization chamber having reduced dead volume and improved peak resolution comprising an outer electrode having a cylindrical section adjoined at one end to a converging end section and an inner electrode concentrically mounted within the outer electrode, means for introducing a gas tangentially to the inside wall of the outer electrode and a gas outlet means located on the converging end section.

PATENTED MAR 9 1971　　3,569,767

SECTION A-A'

INVENTOR.
Royal H. Benson
BY Elizabeth F. Sporar
AGENT

3,569,767

FLOW IONIZATION CHAMBER

BACKGROUND OF THE INVENTION

The present invention relates to an improved apparatus for the measurement of radiation and more particularly, to an improved flow ionization chamber especially useful in the measurement of tritium and other beta-emitting radioisotopes.

The theory of the detection and measurement of radiation by means of ionization chambers is well known. Briefly, the technique involves the interaction of radiation with gaseous matter to produce electrons and ionized gas molecules, collection of the ions and electrons thus produced on positive and negative electrodes and measurement of the quantity of ions so collected by a suitable means such as an electrometer. In particular, the use of ionization chambers for the measurement of radioactivity in flowing gas systems has come into widespread use especially for the measurement of weak-beta radioactivity, usually at ambient or above ambient temperatures, which is not readily accomplished by other radiation-measuring techniques.

The measurement of radioactive components in effluents from gas chromatographs is one example of the use of a flow ionization chamber which has become particularly important. In this technique, a mixture of components some or all of which may be radioactive, e.g., containing tritium, $C^{14}$ or other radioisotopes, are separated by the gas chromatograph and the effluent, comprised of a carrier gas and each resolved component, passed into the ionization chamber. As each resolved component enters the ionization chamber, its radioactivity, if any, is measured and recorded by a suitable recording device, usually as a peak, the area of which is in proportion to the amount of radioactivity in said resolved component. One of the shortcomings that has plagued the ionization chambers of the prior art has been their inability to keep the individual components adequately resolved during measurement with the result that the peak from one component will overlap the peak from a succeeding component. When this "tailing" occurs, the accuracy of the radioactive measurement of each component is severely reduced.

The most probable cause of this "tailing" phenomonon observed in prior art ionization chambers is the existence of dead volume, i.e., regions within the ionization chamber where the gas flow is comparatively stagnant with the result that any radioactive components located therein are only slowly displaced by the carrier gas. This slow displacement leads to the characteristic "tailing" and overlapping of peaks.

SUMMARY

It is, therefore, an object of the present invention to develop an improved flow ionization chamber. It is a further object of the present invention to develop an improved flow ionization chamber for use in gas chromatographic systems. Another object of the present invention is to develop an improved flow ionization chamber for the measurement of tritium-containing components. It is also an object of the present invention to provide an improved flow ionization chamber which substantially eliminates the problem of dead volume and loss of resolution of narrowly separated components entering the chamber.

These and other objects of the present invention can be accomplished by the ionization chamber of the present invention comprising an outer electrode having a substantially cylindrical section adjoined at one end to a converging end section, a transverse section of said converging end section being substantially circular, an inner electrode disposed in and insulated from said outer electrode at the end opposite said converging end section, at least one gas inlet means located at and substantially flush with the end of said chamber opposite the end having said converging end section, said gas inlet means being disposed so as to direct the gas flow therethrough tangential to the inner surface of said cylindrical section of said outer electrode and a gas outlet means connected to said converging end section.

DESCRIPTION OF THE PREFERRED DRAWINGS

DESCRIPTION OF THE PREFERRED EMBODIMENTS

Figure 1:
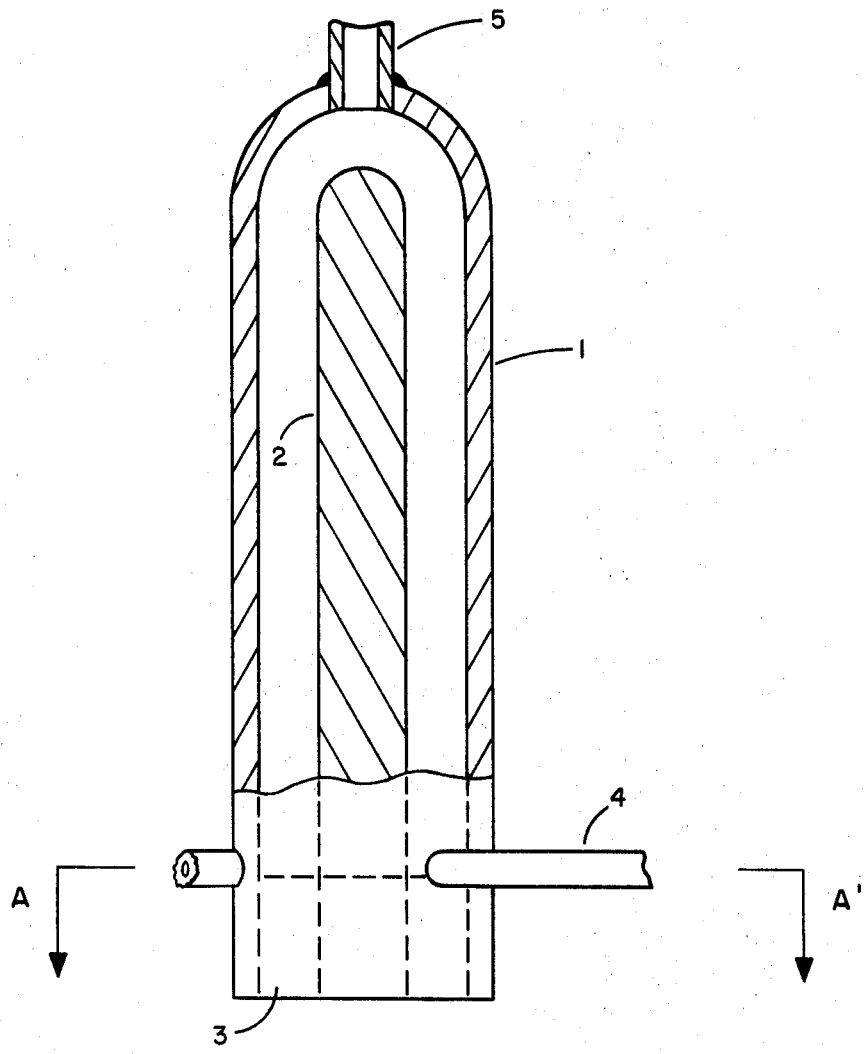
FIG 1 is a sectional side view of a flow ionization chamber exemplifying one embodiment of the present invention wherein the converging end section is hemispherically shaped.
Figure 2:
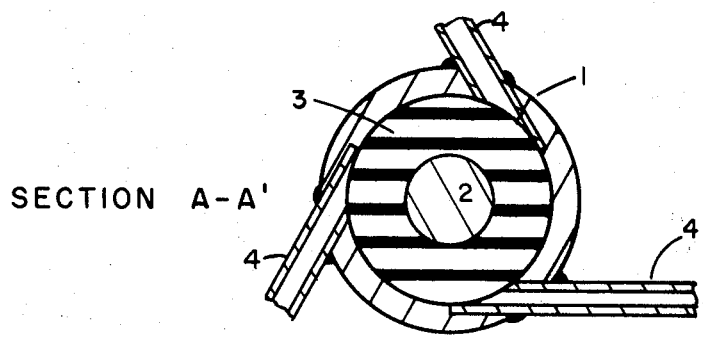
FIG. 2 is a sectional view along line A—A' of FIG. 1 showing disposition of the gas inlet means.
Figure 3:
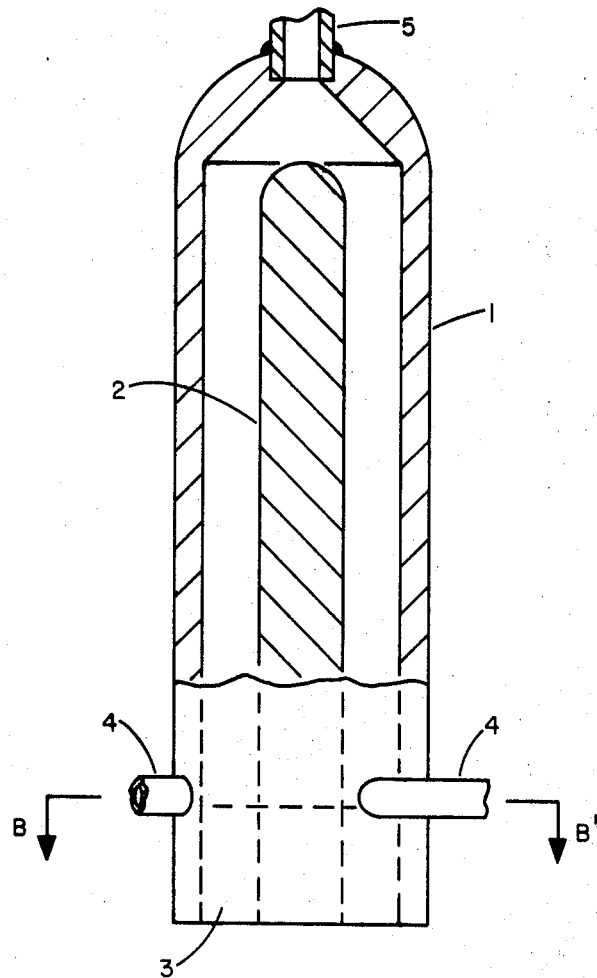
FIG. 3 is a sectional side view of a flow ionization chamber exemplifying another embodiment of the present invention wherein the converging end section has a frustoconical shape.
Figure 4:
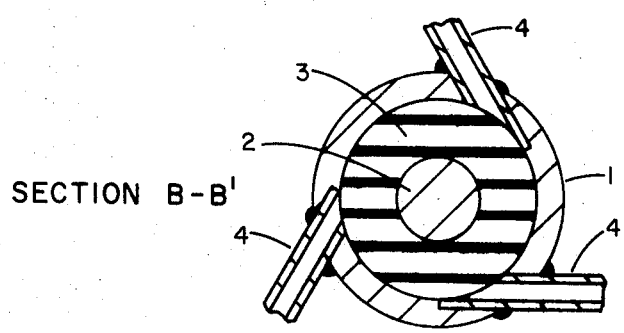
FIG. 4 is a sectional view along B—B' of FIG. 3 showing disposition of the gas inlet means.

Referring now to FIG. 1, there is shown generally an ionization chamber 1, the outer electrode of which is comprised of a cylindrical section and a converging end section. Inner electrode 2 lies coaxial with the cylindrical section and is held in place by insulator 3. Gas inlet means 4, which can be a piece of tubing inserted into the wall of the cylindrical section and can be held in place by silver solder or other suitable means, is disposed in ionization chamber 1 opposite the converging end section and flush with the bottom of the chamber formed by insulator 3 while gas outlet means 5, which can also be a piece of tubing held in place by silver solder or other suitable means, is located at the apex of the converging end section. FIG. 2, in which the characters are the same as in FIG. 1, shows the connection of gas inlet 4 such that gas flow therethrough is directed tangential to the inner surface of the cylindrical section. Insulator 3 and inner electrode 2 are also shown. As will be readily recognized from the above description, gas entering through gas inlet means 4 is directed tangential to the inner surface of the cylindrical section and flush with the bottom of the chamber as formed by insulator 3. By locating gas outlet means 5 preferably at the apex of the converging end section of chamber 1, the entire volume of the chamber 1 is swept continuously by the carrier gas with the result that no regions of dead volume occur and narrowly separated radioactive components entering the chamber are kept resolved. It should be pointed out that the apparatus need not be operated in the position shown in FIG. 1 so that any reference herein to terms such as "up" or "down" is only relative to the apparatus as shown.

For purposes of clarity, the flow ionization chamber illustrated in FIG. 1 is of a very elementary structure. As will be readily apparent to those familiar with the operation of conventional flow ionization chambers, many well known improvements such as guard rings, shields, etc., which are not material to the present invention, can be incorportated therein. Also, as will be recognized by those skilled in the art, the electrical circuit attendant with the operation of the flow ionization chamber has not been illustrated. In practice, all that is required is that the outer electrode of the chamber is negatively charged, usually by means of a battery, whereas inner electrode is kept fairly close to ground potential and is connected to a sensitive current or charge measuring d3vice such as a DC amplifier or more preferably to a vibrating reed electrometer. In operation, the gas inlet means 4 is connected to a source of gas containing the radioactive component to be measured such as the effluent from a gas chromatograph. The advantages of the present invention will be more fully demonstrated by the following examples which, however, are not to be construed as limitations on the scope thereof.

EXAMPLE I

Figure 5:
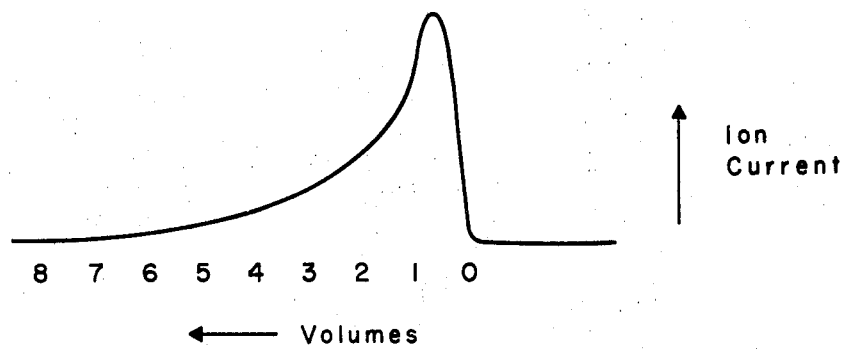
FIGS. 5, 6 and 7 show a comparison of the measurements of radioactivity of Xenon 133 obtained using a prior art flow ionization chamber and two flow ionization chambers embodying the principles of the present invention.

A one-liter spherical flow ionization chamber of conventional design known as a Cary-Tolbert Ion Chamber was used in conjunction with a Model 401 Cary Vibrating-Reed Electrometer and a Leeds & Northrup Speedomax Type G Recorder. The gas inlet of the chamber was connected to a source of methane and a flow rate of one volume (of the ion chamber) per 20 seconds maintained. A fixed volume of Xenon 133 was injected into a sample port of the methane carrier gas line and the radioactivity measurement recorded. FIG. 5 shows the recording obtained. As is clearly seen, the peak from the radio active Xenon 133 sample tails badly, the recorder pen not returning to the base line until eight volumes of carrier gas have been passed through the chamber.

EXAMPLE 2

Figure 6:
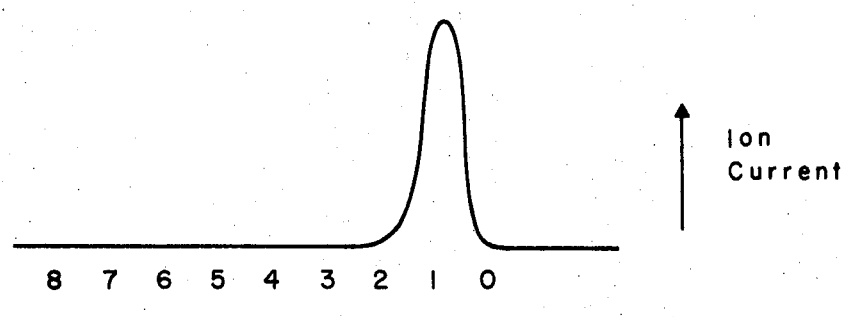

A flow ionization chamber substantially as shown in FIGS. 1 and 2 and described above was connected in exactly the same manner as the flow ionization chamber of Example 1. The chamber had a volume of 20 cc. The cylindrical section had a 7/16-in. inside diameter and was 9.78-in. long. The converging end section was of a hemispherical shape. The methane carrier gas was maintained at a flow rate of one volume (of the chamber) per 20 seconds. Exactly the same volume of Xenon 133 as was employed in Example 1 was injected into the port of the methane carrier gas line. The results are shown in FIG. 6. The peak shows very little tailing, the recorder pen returning to the base line after about two volumes of carrier gas have passed through the chamber

EXAMPLE 3

Figure 7:
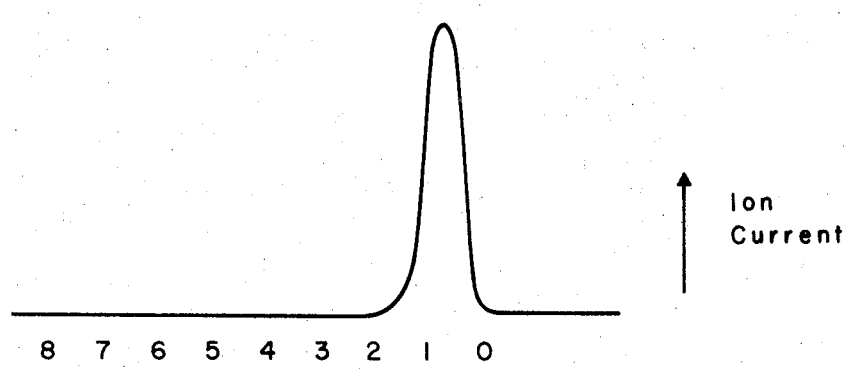

A flow ionization chamber very similar to the one of Example 2 but differing in having a cylindrical section of inside diameter equal to 11/16-in. and a length of 3.04 in. was connected as per Example 1. A methane flow rate of one volume (of the chamber) per 20 seconds was maintained. A volume of Xenon 33 equal to that employed in the previous examples was injected and measured. FIG. 7 shows the results. Little tailing is observed, the recorder pen returning to the base line after three volumes of gas have passed through the chamber.

As the above examples conclusively demonstrate, the flow ionization chambers of the present invention substantially eliminate the problem of dead volume and the resulting "-tailing" effect noted in prior art chambers. It is further to be observed that this improved resolution over prior art chambers is accomplished with little loss in sensitivity.

Although the present invention has only been exemplified with reference to a carrier gas containing a single radioactive component, it will be immediately apparent to those skilled in the art that the chambers of the present invention are especially suited for use in conjunction with a gas where the effluent carrier gas may contain many narrowly separated components. The use of the chambers of the present invention, with their ability to maintain adequate resolution between the separated components, permits the measurement of each radioactive component or peak with minimum interference from adjacent peaks. It is to be understood, however, that the chambers of the present invention are not limited to use with gas chromatographs but are suited for any or all radioactive measurements involving flowing gas streams.

In the examples and illustration, the ion chamber of the present invention has been demonstrated with respect to a converging end section which is hemispherically shaped. However, end sections having other converging shapes can be used. For example, a chamber with an end section having a frustoconical shape has been used and found to work quite successfully. When a frustoconical-shaped end section is used, a base angle of the cone from about 40° to 50° has been found to be preferably. Other converging end shapes such as hemispheroidal or hemiparaboloidal may also be used. At any rate, whatever the exact shape of the converging end section, it will preferably possess a substantially circular transverse section.

The converging end section and the cylindrical section referred to above can be individually constructed and joined by a suitable means such as, for instance, by silver solder, etc. The preferable method, and the one depicted in FIG. 1, is to form the converging end section and the cylindrical section from a single piece of material. Suitable materials construction for these sections include pure iron, pure copper, stainless steel, and brass containing no lead or brass plated with a pure metal. Generally, a length-to-diameter ratio of the cylindrical section from about 4:1 to about 25:1 is suitable, however, the preferred ratio is from about 10:1 to about 15:1.

The inner electrode used in the ion chamber of the present invention can be constructed of the same conducting materials sued to make the outer electrode. Preferably, the end of the inner electrode which extends into the outer electrode has a rounded shape such as, for instance, hemispherical or hemispheriodal, etc. Although the length of the inner electrode is not extremely critical, it has been found desirable to have it of a length substantially the same as that of the cylindrical section of the outer electrode. In most cases, the inner electrode is mounted within the outer electrode by means of an insulating material such as sapphire or polytetrafluoroethylene. However, other insulating materials such as polystyrene, quartz, etc., may be used.

The flow ionization chambers of the instant invention may contain one or a plurality of gas inlet means, the only requirement being that they be mounted flush with the end of the chamber as formed by the insulator and opposite the converging end section and be disposed so as to direct the gas flow therethrough tangential to the inner surface of the cylindrical section of the outer electrode.

The gas outlet means is preferably located at the apex of the converging end section. This arrangement prevents any dead volume regions which might occur if the outlet is located lower on said section. In the drawing, both the gas inlet means and gas outlet means have been shown as pieces of metal tubing fitted into circular apertures in the walls of the cylindrical section and converging end section, respectively, and held in place by silver solder. Other techniques, readily apparent, can be used to attach the gas inlet and outlet means without departing from the scope of the invention herein.

The size of the flow ionization chambers of the present invention may be varied to provide capacities of from 1 cc and smaller to 10 liters and larger so long as the converging end section and tangential gas flow inlet principles described above are adhered to.

As a general rule, the distance between the outer surface of the inner electrode and the inner surface of the outer electrode is not critical and can range from 1 mm to 10 cm and larger depending on the volume of the chamber, etc. Furthermore, in the case of conventional flow ionization chambers, the efficiency of the radioactive measurement is believed to increase as the volume of the chamber increases, the efficiency reaching a maximum, for tritium, of about 80 percent at a 1 liter volume. However, using the flow ionization chambers of the present invention, 75 percent efficiency can be obtained for the measurement of tritium in a chamber having a volume of only 20 cc. In this instance, the distance between the outer surface of the inner electrode and the inner surface of the outer electrode should be from 1—4 mm.

I claim:

1. An improved flow ionization chamber comprising an outer electrode having a substantially cylindrical section adjoined at one end to a converging end section, the length-to-diameter ration of said cylindrical section being from 4:1 to 25:1, a transverse section of said converging end section being substantially circular, an inner electrode disposed in and insulated from said outer electrode at the end opposite said converging end section, at least one gas inlet means located at and substantially flush with the end of said chamber opposite the end having said converging end section, said gas inlet means being disposed so as to direct the gas flow therethrough tangential to the inner surface of said cylindrical section of said outer electrode and a gas outlet means connected to said converging end section.

2. The apparatus of claim 1 wherein said inner electrode is of substantially the same length as said cylindrical section of said outer electrode.

3. The apparatus of claim 2 wherein said converging end section has a hemispherical shape.

The apparatus of claim 2 wherein said converging end section has a frustoconical shape.

5. The apparatus of claim 3 wherein a plurality of gas inlets are present.

6. The apparatus of claim 3 wherein said gas outlet means is located at the apex of said converging end section.

7 The apparatus of claim 4 wherein a plurality of gas inlets are present.

8. The apparatus of claim 4 wherein said gas outlet means is located at the apex of said converging end section.

9. The apparatus of claim 4 wherein the distance between the outer surface of said inner electrode and the inner surface of said cylindrical section of said outer electrode is from 1—4 mm.